(12) United States Patent
Oberhoffner

(10) Patent No.: US 8,222,889 B2
(45) Date of Patent: Jul. 17, 2012

(54) ARRANGEMENT FOR DETECTING THE MOVEMENT OF A BODY AND A METHOD FOR THE OPERATION OF SUCH AN ARRANGEMENT

(75) Inventor: Gerhard Oberhoffner, Graz (AT)

(73) Assignee: austriamicrosystems AG, Unterpremstätten (AT)

( * ) Notice: Subject to any disclaimer, the term of this patent is extended or adjusted under 35 U.S.C. 154(b) by 773 days.

(21) Appl. No.: 12/337,295

(22) Filed: Dec. 17, 2008

(65) Prior Publication Data

US 2009/0160433 A1 Jun. 25, 2009

(30) Foreign Application Priority Data

Dec. 17, 2007 (DE) .......................... 10 2007 060 707

(51) Int. Cl.
*G01B 7/14* (2006.01)

(52) U.S. Cl. ................. 324/207.13; 324/207.2; 324/244; 379/406.01

(58) Field of Classification Search ............. 324/207.13, 324/207.12, 244, 207.26, 251, 207.2; 74/335; 345/161; 379/406.01
See application file for complete search history.

(56) References Cited

U.S. PATENT DOCUMENTS

| | | | |
|---|---|---|---|
| 4,093,917 A * | 6/1978 | Haeussermann | ............. 324/173 |
| 5,691,637 A | 11/1997 | Oswald et al. | |
| 5,831,596 A * | 11/1998 | Marshall et al. | ............... 345/161 |
| 6,563,306 B2 * | 5/2003 | Sato | ............................ 324/207.2 |
| 6,577,731 B1 * | 6/2003 | Sugiyama | ................ 379/406.01 |
| 7,839,140 B2 * | 11/2010 | Holmstrom | ............... 324/207.21 |
| 2002/0008513 A1 * | 1/2002 | Hiligsmann et al. | .......... 324/251 |
| 2006/0125473 A1 * | 6/2006 | Frachon et al. | .......... 324/207.26 |
| 2007/0137337 A1 * | 6/2007 | Kim | ................................... 74/335 |
| 2007/0279044 A1 * | 12/2007 | Rossmann et al. | ......... 324/207.2 |

FOREIGN PATENT DOCUMENTS

DE 10 2004 010 613 10/2005

* cited by examiner

*Primary Examiner* — Huy Q Phan
*Assistant Examiner* — Temilade S Rhodes-Vivour
(74) *Attorney, Agent, or Firm* — Cozen O'Connor

(57) ABSTRACT

An arrangement for detecting a movement of a body, in which the body (20') is mounted in such a way that it can move in at least one direction and in which a magnet (200) is incorporated. Its poles are aligned substantially parallel to a primary plane. A detector system is furthermore provided that comprises at least four magnetic field sensors (10a to 10d) for the detection of a change in the magnetic field when the body (20') moves. In addition, a further magnetic field sensor (11) is provided for generating a correction signal that depends on the magnetic field. An evaluation unit (20) is used to provide movement information relating to the body (20') derived from signals from the four magnetic field sensors (10a to 10d) and the minimum of one further magnetic field sensor (11).

24 Claims, 4 Drawing Sheets

ARRANGEMENT FOR DETECTING THE MOVEMENT OF A BODY AND A METHOD FOR THE OPERATION OF SUCH AN ARRANGEMENT

RELATED APPLICATIONS

This patent application claims the priority of German patent application 10 2007 060 707.7 filed Dec. 12, 2008, the disclosure content of which is hereby incorporated by reference.

FIELD OF THE INVENTION

The invention concerns an arrangement for the detection of a movement of a body, in particular of the displacement or tilting of such a movable body. The invention also concerns a method for the operation of an arrangement of this type.

BACKGROUND OF THE INVENTION

The detection of movement, for instance a displacement of a movable body with regard to a reference point, or of a tilt of the same body with respect to a reference plane, is used in a large number of different applications. Frequently, arrangements of this type for detecting a movement, in particular a displacement, are known as "joysticks". These "joysticks" are employed for the input of various parameters. A non-exhaustive list of examples includes possible applications in automobiles, aircraft, toys or in mobile telephones. In addition, arrangements of this type can be used to detect a movement in the manner of a slide switch in order, for example, to activate and initialize various functions depending on a position or on the speed of movement.

SUMMARY OF THE INVENTION

One object of the invention is to provide an arrangement for the detection of the movement of a body in which the detection is carried out in a simple manner while at the same time providing high resolution and only small errors. A corresponding method for detecting the movement of a body is provided.

The invention is based on the idea that when detecting a movement of the body, in particular a displacement of this kind, the sensors used until now provide a non-linear response function. This non-linearity, which is present due to the nature of the structure, can now be compensated for by taking additional measures, so that, on the one hand, a more precise and sensitive detection of the movement of the body is achieved and, on the other hand, the available range in which a movement can be detected is extended.

In one embodiment, an arrangement for the detection of a movement of a body comprises the body, which is mounted on bearings that permit it to move in at least one direction. The body contains a magnet, having poles that are aligned, generally speaking, along a primary plane. The arrangement also contains a detector system having at least four magnetic field sensors for the purpose of detecting a change in the magnetic field when the body moves. In addition, at least one further magnetic field sensor is provided in order to generate a correction signal that depends on the magnetic field.

Finally, an evaluation unit serves to provide movement information relating to the body. The movement information is derived here from the signals of the minimum of four magnetic field sensors and the minimum of one additional magnetic field sensor. A differential evaluation can most appropriately be used here.

The embodiment is inter alia based on the inventive idea that, through the use of at least one additional magnetic field sensor, linearization of the non-linear signals obtained from the minimum of four magnetic field sensors can be achieved. One of a number of techniques for achieving this is a differential evaluation of the signals from the four magnetic field sensors, in which a vectorial difference signal representing a sum of the signals of the four sensors, and the signal of the additional sensor, are scaled.

Favourably, here, the minimum of one additional magnetic field sensor can be positioned symmetrically with reference to a rest position of the body or with reference to a rest position of the magnets. In this way a correction signal that changes in response to the magnetic field when the body moves can be generated. This correction signal is used to linearize the signals provided by the minimum of four other magnetic field sensors. The last-mentioned fields represent the direction of movement of the body.

The invention is thus not restricted to the detection of a displacement. It is equally possible to detect tilting of the body with reference to a direction, and to determine the magnitude of the tilt and, with the additional sensor, to improve the precision through subsequent linearization.

In one embodiment, two of the minimum of four magnetic field sensors are positioned along one axis. At the axis intersection point generated by the four magnetic field sensors, at least one additional magnetic field sensor is positioned, substantially symmetrical with respect to the axis intersection point. In addition, the magnetic field sensors can be displaced with respect to the primary direction of movement of the body. This improves signal acquisition, and increases the precision with which a movement is detected.

With aid of the minimum of one additional magnetic field sensor, an additional value is provided during the later evaluation; this improves the signal/noise ratio, and therefore results in a total signal suitable for evaluation even when the excursion and the associated movement of the body are large.

For this reason, in one embodiment of the invention, the evaluation unit is configured to generate a sum signal from the minimum of four magnetic field sensors and the minimum of one additional magnetic field sensor. The direction of the movement can be obtained by vector addition of the signals from the minimum of four magnetic field sensors. In another embodiment, the evaluation unit is designed for linearization of the signals from the minimum of four magnetic field sensors, using a signal from the minimum of one additional magnetic field sensor.

The invention is suitable both for the detection of a displacement of the body and for detection of a tilt of the body with reference to a primary plane. In both cases, the amplitude of the signal changes depending on the magnetic field strength in one or more of the magnetic field sensors. With the aid of the minimum of one additional magnetic field sensor, the output signal of which is not in fact used to determine the direction of the body's movement but rather is used to generate a linearizing correction signal, the precision of a detection arrangement is improved while the detectable range is also increased.

BRIEF DESCRIPTION OF THE DRAWINGS

The invention is explained in detail below with the aid of several example embodiments and with reference to the figures and drawings. Elements having the same function or constructed in the same way have the same reference numbers.

DETAILED DESCRIPTION OF THE DRAWINGS

Figure 1:
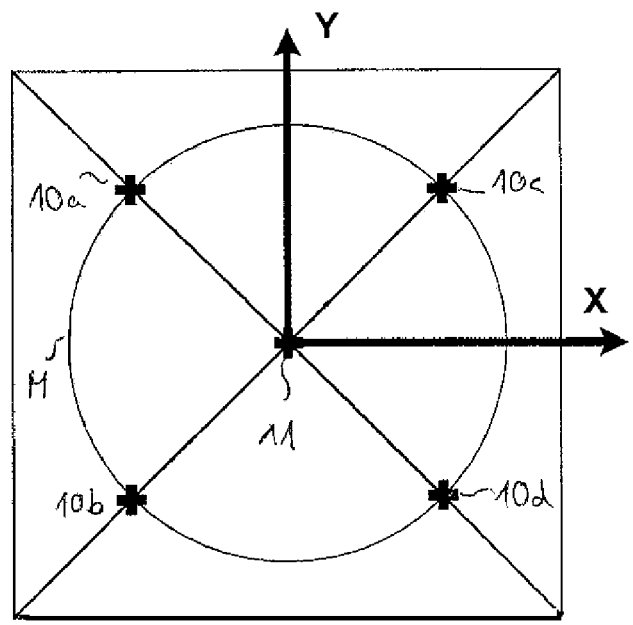
FIG. 1 a schematic view from above of a first embodiment of an arrangement into which magnetic field sensors are integrated.

FIG. 1 shows a view from above of an example of an embodiment of an arrangement for detecting a movement of the body according to the invention. The arrangement comprises several magnetic field sensors 10a to 10d in the plane shown here, and an additional magnetic field sensor 11. The individual magnetic field sensors 10a to 10d, used to obtain movement information, are each arranged in pairs along an axis that is represented as a continuous line.

Specifically, the two magnetic field sensors 10a and 10d are positioned along a first diagonal axis, while the magnetic field sensors 10b and 10c are positioned on a second diagonal axis substantially perpendicular to the first. The spatial positioning of the magnetic field sensors with respect to the primary axis of excursion X and Y of the body are offset here by 45 degrees. This improves the signal detection when the body is displaced in the X or Y direction.

The magnet that is attached to the body is shown here as a circular element M having a radius that corresponds to half the distance between the magnetic field sensors 10a and 10d, or 10b and 10c. It is, of course, possible to select other relationships. For instance the space between the neighbouring magnetic field sensors 10a and 10c or between 10a and 10b can be between 0.8 and 1.5 times the corresponding magnet diameter. A range of between 0.8 and 2.4 times the diameter of the magnetic field can be selected as the distance between the magnets and the magnetic field sensors. Other ranges are, of course, possible, depending on the shape and strength of the magnetic field.

In addition, a further magnetic field sensor 11 is located at an intersection of the two diagonal axes created by the arrangement of the magnetic field sensors 10a to 10d. This is therefore aligned symmetrically with reference to a rest position of the magnets and therefore of the movable body.

Figure 2B:
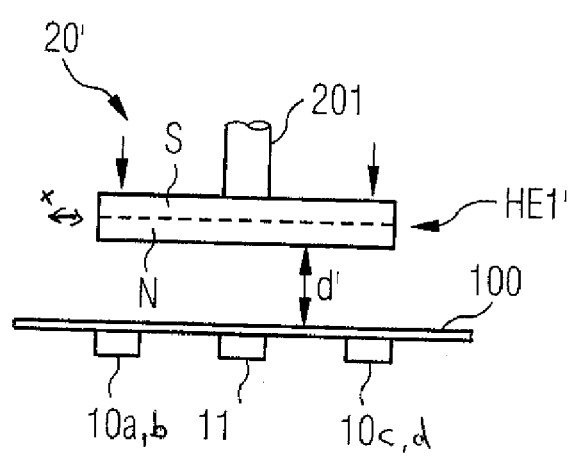
FIGS. 2A and 2B are side views of an embodiment of the arrangement for the detection of a movement of a body as shown in FIG. 1, FIG. 3 an embodiment of an arrangement with an evaluation circuit, FIG. 4 a schematically illustrated embodiment of a magnetic field sensor in the arrangement, FIG. 5 a signal-excursion diagram for the purposes of explaining the different signals delivered by the magnetic field sensors, FIG. 6 a signal-excursion diagram for the purpose of explaining a corrected signal in comparison with uncorrected movement information, FIG. 7 a signal-excursion diagram with a differential representation of an excursion with uncorrected movement information and with movement information that has been corrected using the proposed principle.
Figure 2A:
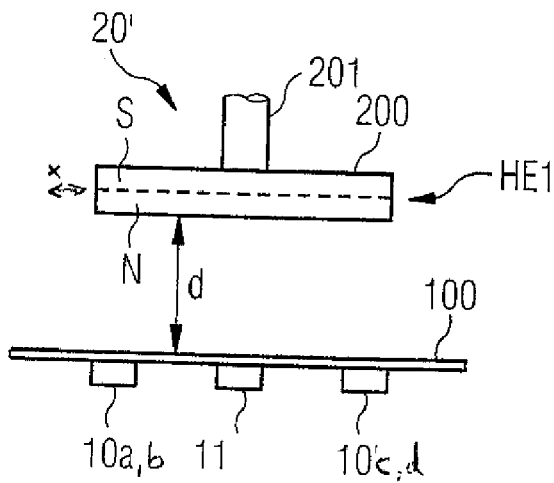

FIG. 2A shows a sectional view along the X-axis of the arrangement according to the invention, with the movable body 20' and the magnet 200 (corresponding to magnet M in FIG. 1) attached to it. The magnet 200 can be displaced by the peg 201, moving essentially parallel to a primary plane HE1. One of the possible directions of movement here is sketched in the X-direction The magnet 200 is, moreover, aligned axially, i.e. the existing magnetic field is rotationally symmetrical about an axis passing through the fastening 201 perpendicularly to the primary plane HE1. In the present case, the north magnetic pole is pointing towards the magnetic field sensors. This is not, however, a necessity.

The detector system, including the individual magnetic field sensors 10a, b and 10c, d is positioned at a distance d on a substrate 100. Movement now induces a voltage in the magnetic field sensors; this voltage is detected by an evaluation circuit, not shown here, and represented as movement information.

In subsidiary FIG. 2B, a pressure on the other side of the movable body reduces the distance d down to the distance d'. As a result of this, the amplitude, and therefore the signal strength, in the individual magnetic field sensors 10a to 10d and 11 rises, as a result of which a pushing or pulling function can be implemented. For instance, the distance d or d' can be 0.5 mm to 1.5 mm, or can, for instance, be 0.3 to 1.0 times the diameter of the magnet 200.

If now, as illustrated in FIGS. 2A and 2B, the magnet 200 is displaced along the X-direction, this will change the signal strengths in the various magnetic fields sensors 10a to 10d. If, for instance, the magnet 200 is displaced towards the left (as viewed in the figure), this will cause the magnetic field in magnetic field sensors 10a and 10b to rise, whereas at the same time it will fall in magnetic field sensors 10c and 10d. As a result, a signal corresponding to magnetic field sensors 10a and 10b becomes larger, while in magnetic field sensors 10c and 10d it becomes smaller. In general, a shift in the X-direction gives rise to the absolute difference:

$$\text{Diff\_abs\_}x = S_{10c} + S_{10d} - S_{10a} - S_{10b} \tag{1}$$

where $S_{10a}$ to $S_{10d}$ give the signal strengths at that time in the corresponding magnetic field sensors. Correspondingly, the formula $$\text{Diff\_abs\_}y = S_{10c} - S_{10d} + S_{10a} - S_{10b} \tag{2}$$

applies for the absolute difference in the Y-direction.

The results substantially represent a vector in the X or Y directions respectively, with the magnitude of the difference being given by the length of the vector. For differential evaluation now the absolute difference in the X and Y directions are divided by the total of the four magnetic field sensors and of the additional magnetic field sensor 11 for correction. This division leads to a relative result, without the need for an absolute reference that would otherwise be necessary. Altogether, a differential evaluation in the X or Y direction yields the expressions:

$$\text{Diff\_x} = \frac{\overrightarrow{S_{10c} + S_{10d} - S_{10a} - S_{10b}}}{S_{10c} + S_{10d} + S_{10a} + S_{10b} + S_{11}} \tag{3}$$

$$\text{Diff\_y} = \frac{\overrightarrow{S_{10c} + S_{10d} + S_{10a} - S_{10b}}}{S_{10c} + S_{10d} + S_{10a} + S_{10b} + S_{11}} \tag{4}$$

$S_{11}$ here represents the signal from the additional magnetic field sensor. Using the signal $S_{11}$ from the additional magnetic field sensor makes it possible to still generate an adequate signal in the denominator of the division shown even when the movable body is displaced a long way. Otherwise, in the case of a large excursion, the sum of the four magnetic field sensors would be very small with respect to any noise, and this would mean that the deteriorating signal/noise ratio would result in a larger error.

The additional magnetic field sensor 11, the output signal of which also depends slightly on the direction, therefore results in an improvement in the signal/noise ratio. In addition, it is seen that the slight dependency of the signal S11 on the magnetic field strength leads to a linearization of the result. This yields a further improvement in the precision of the evaluation.

Figure 5:
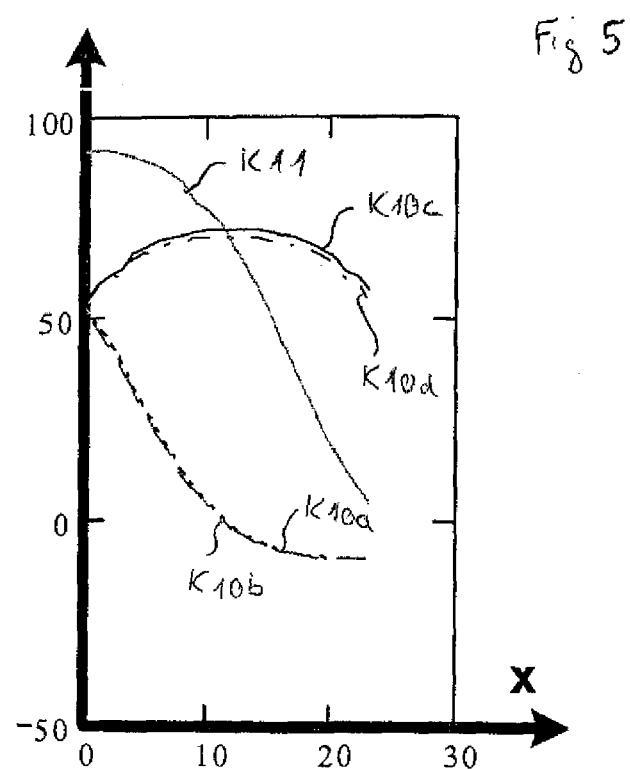

FIG. 5 shows a diagram in which the absolute signal strengths from the individual sensors 10a to 10d and 11 are illustrated with reference to the direction of the excursion. As a possible excursion direction here, the X-direction is shown with arbitrarily chosen units of 10 to 30. These last figures represent displacement units.

The signal represented by curve K11 corresponds to the signal delivered by the additional magnetic field sensor 11, and falls away continuously as the excursion increases from 0 up to about x=25. It is also possible to see that the two magnetic field sensors 10c and 10d, as well as the sensors 10a and 10b, deliver signals with substantially the same characteristic. The signal in the sensors 10c and 10d rises at first in accordance with curves 10c and 10d, before then falling back. This results, in terms of FIG. 1, from the fact that the magnet is pushed across and beyond the direct connecting line between sensors 10c and 10d. As a result, the field strength falls away again, and the curve drops correspondingly.

The bend in the two signal curves K10c and K10d for the two magnetic field sensors 10c and 10d has the effect that more than one excursion in the X-direction is possible for one specific signal strength.

Figure 6:
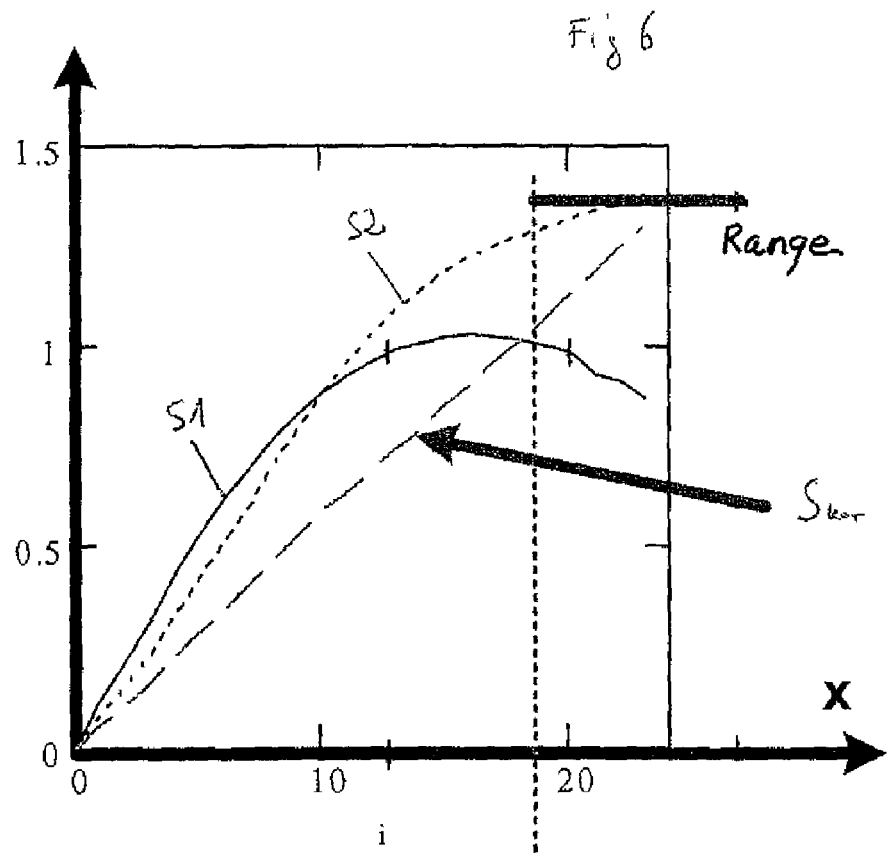

This behaviour can be seen clearly in the diagram of FIG. 6. This again shows a signal curve in relationship to an excursion in the X-direction, using arbitrarily selected units. Arbitrarily selected units are also shown on the abscissa. The curve S1 illustrates the absolute difference in the X-direction obtained from expression (1). It can clearly be seen that the curve is ambiguous in the region beyond the dotted vertical line. The signal strength of curve S1 at an excursion of about x=20, for instance, is the same as the signal strength at an excursion of x=13. This means that there is a maximum range of excursions within which a shift of the body can be detected without error. This range is between x=0 and approximately x=19 where the upper limit is indicated by the vertical line labeled "Range".

In contrast, curve S2 shows a signal characteristic that can be obtained using formula (3), although without taking into account the signal of the additional magnetic field sensor. The additional range now available for the excursion is significantly extended here, and ambiguity only occurs, if at all, much later. Nevertheless, curve S2 demonstrates a strong non-linearity. This non-linearity must be taken into account in order to obtain the most accurate possible movement information, or it can lead to errors.

The third curve, $S_{kor}$, finally shows the signal characteristic when it has been corrected with the aid of the additional magnetic field sensor, and can be obtained with the aid of formulas (3) and (4). It can be seen that the signal from the supplementary magnetic field sensor 11 in the denominator of the formula (3) results in linearization, so that on the one hand the precision of movement information is improved, and the permitted range for the excursion is greatly extended.

Figure 7:
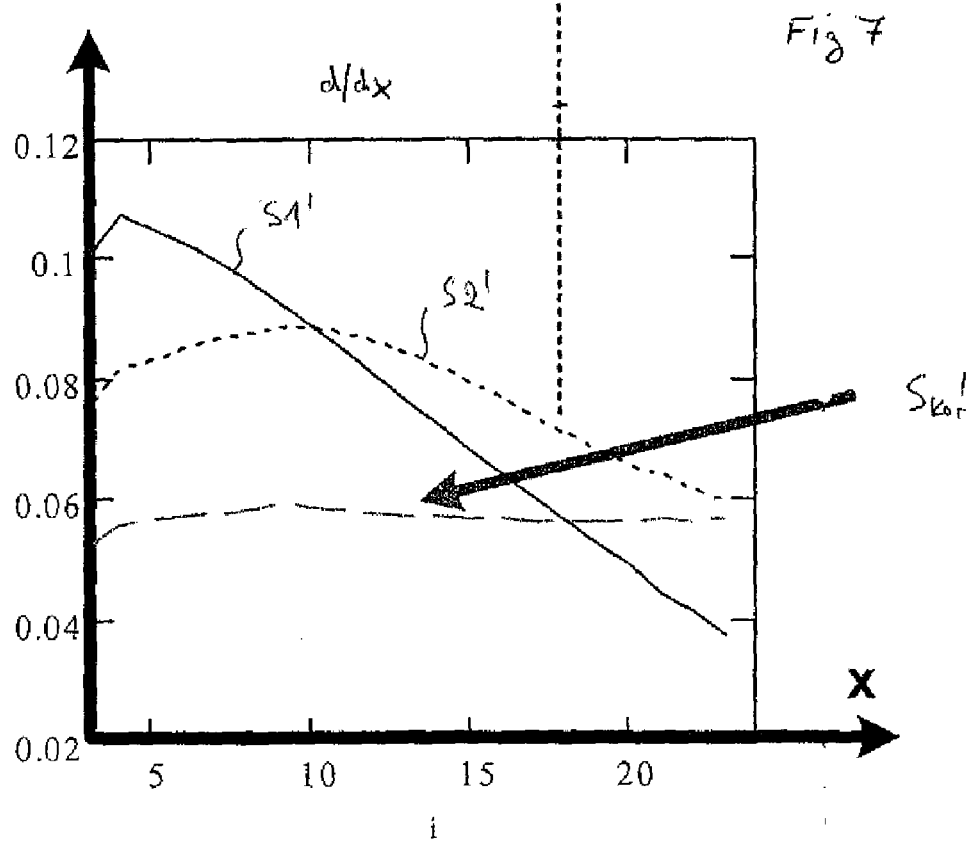

FIG. 7 also illustrates the derivative d/dx of the curve shown in FIG. 6 against the excursion x. The essentially constant gradient of 0.06 for the curve $S_{kor}$ demonstrates the good linearity and the directly proportional relationship achieved with the correction signal from the additional magnetic field sensor 11. A further improvement can be achieved by regulating the current through the magnetic field sensor 11, thereby changing the sensitivity. This permits the linearity to be optimized further. The correction element is supplied with an additional signal that depends on the displacement or the tilt of the magnet. An iterative correction results. The current through the magnetic field sensor 11 may be a function of the movement direction as well as the magnetic field strength. For instance, if the signal through one of the other sensors increases (indicating movement in that direction), the current through the magnetic field sensor 11 may be varied to compensate for spurious signals or to increase the signal/noise ratio.

As a result, therefore, using the signal from the additional sensor, which is not used to evaluate the movement as such but rather for the purposes of a correction factor, a significant improvement is achieved in the acquisition of movement information. At the same timer the range of excursion or of tilt for which the results are defined is extended.

Figure 3:
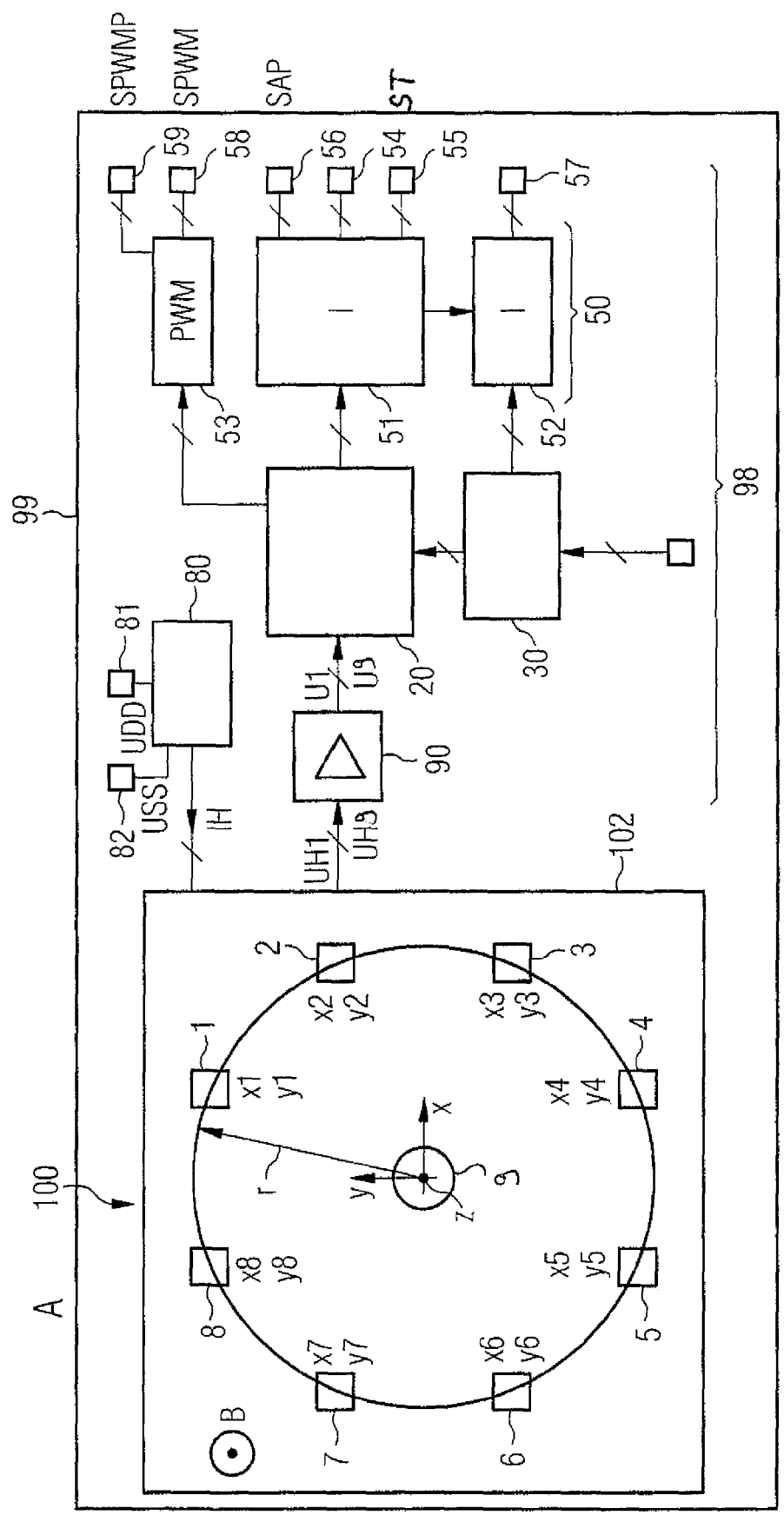

FIG. 3 illustrates an example of an embodiment of a sensor system 100 to which an evaluation circuit 98 has been connected in accordance with the invention. The sensor system 100 is located on a semiconductor body 99 together with the evaluation circuit 98. In this embodiment, a partial region 102 of the sensor system 100 contains eight symmetrically arranged magnetic field sensors 1 to 8 arranged around a circle of radius r. The eight magnetic field sensors are located at the corners of a conceptual octagon, which is not drawn. This means that the x-coordinates of the first and fourth magnetic field sensors, of the second and third magnetic field sensors, of the seventh and sixth magnetic field sensors and of the fifth and eighth magnetic field sensors are approximately identical. Similarly, the y-coordinates of the first and eighth magnetic field sensors, of the second and seventh magnetic field sensors, of the third and sixth magnetic field sensors and of the fourth and fifth magnetic field sensors are approximately identical.

The sensor signals UH1 to UH8 are processed in a following arrangement in order to perform the evaluation. Signals from the magnetic field sensors can, for this purpose, be combined; for instance, sensors 1 and 2 represent one sensor pair, the signals of which are combined prior to the evaluation. Equally it would be conceivable to process these jointly, in order to achieve greater precision. As has already been done in formulas (1) and (2), it is possible to generate an absolute difference signal, relating, for instance, to a displacement in the X-direction with $$Diff\_abs\_x = S_1 + S_2 + S_3 + S_4 - S_8 - S_7 - S_6 - S_5$$

As an alternative it is also possible to form an arithmetic mean between two neighbouring sensors, for instance sensors 1 and 2, and then to form a difference.

In addition, a further sensor 9 is located in the center z, i.e. the rest position of the magnets. This generates the correction signal UH9.

The sensor system in accordance with FIG. 3 can, moreover, be used to detect the tilt of a magnet with reference to a plane HE1 (see FIG. 2). A tilt leads, in a similar way, to a change in the field strengths at the sites of the magnetic field sensors, as a result of which different signal strengths are generated. A direction of tilt and a magnitude can also be determined by finding the differences between the individual sensor signals. The additional signal from sensor 9 is again here used as a correction for improving the precision and the linearity.

The evaluation circuit 98 includes an amplifier circuit 90, the input of which is supplied with the sensor output signals UH1 to UH9 from the first through to the ninth magnetic field sensors. The output of the amplifier circuit 90 for the amplified sensor signals U1 to U9 is connected to a computing unit 20.

Here the difference output signals mentioned above are formed, as described, and are further processed. In addition, the evaluation circuit 98 includes a memory 30 and an interface circuit 50. The memory 30 is connected to the computing unit 20' and to the interface circuit 50. The computing unit 20' is also connected to the interface arrangement. The computing unit 20' can, for instance, be implemented as a microcontroller.

The interface circuit 50 comprises a first interface 51 that is connected to the outputs 54 to 56 of the sensor system. A second interface 52 is coupled to an output 57 of the sensor system and is connected to the memory 30. Finally, a third interface 53 is connected to two further outputs 58 and 59. Interfaces 51, 52 and 53 are standard items well known to anyone with ordinary skill in the art. Thus, further details are not deemed necessary.

An appropriate power supply circuit 80 is provided in order to excite the sensor system 100. Its input is coupled to a power supply potential terminal 81 and to a reference potential terminal 82. The power supply circuit 80 generates the excitation current IH; the magnitude of the current can be adjusted, and it supplies the nine magnetic sensors 1 to 9. The magnetic sensors each generate the sensor output signals UH1 to UH9 depending on a magnetic field B that passes through them perpendicularly and on the excitation current IH. The signals UH1 to UH9 are amplified in the amplifier circuit 90, and are fed to the computing unit 20'. The computing unit 20' is now able, as one possibility, to generate a difference between the respective sensor signals using analog circuit technology.

Alternatively, the computing unit 20' first digitizes the amplified sensor output signal U1 to U9, and then performs further processing on the digitized signals. From them, it determines, in the manner described above, the direction and the magnitude with which a magnetic and movable body above the sensor system 100 is displaced. The speed can be determined from changes in the individual signals over time. The derivation illustrated in FIG. 7 can be used for this.

It also detects whether the button-pushing or the pulling function is being exercised. The computing unit 20' uses for this purpose the parameters for the zero-point regulation and for the rest position that are stored in the memory 30 along with, if relevant, corresponding threshold values for determining tilt.

The results determined by the computing unit 20' are passed to the interface circuit 50. The interface circuit 51 provides the signal ST at its output 55; this indicates the direction in which the movable body is displaced. The speed with which the movable body is being displaced with reference to the sensor system is indicated at output 54. Furthermore, a digital signal is made available at output 56, indicating the distance from the movable body or the magnet to the sensor system 100.

The interface 53 generates the pulse-width modulated signals SPWMP and SPWM at outputs 59 and 58 on the basis of the direction of movement and the magnitude. This also permits, for instance, the detection of changes in the direction of displacement or speed over time. Parameters such as the rest position can be loaded into the memory through the interface 52 and the input/output 57, or can be read from it.

Figure 4:
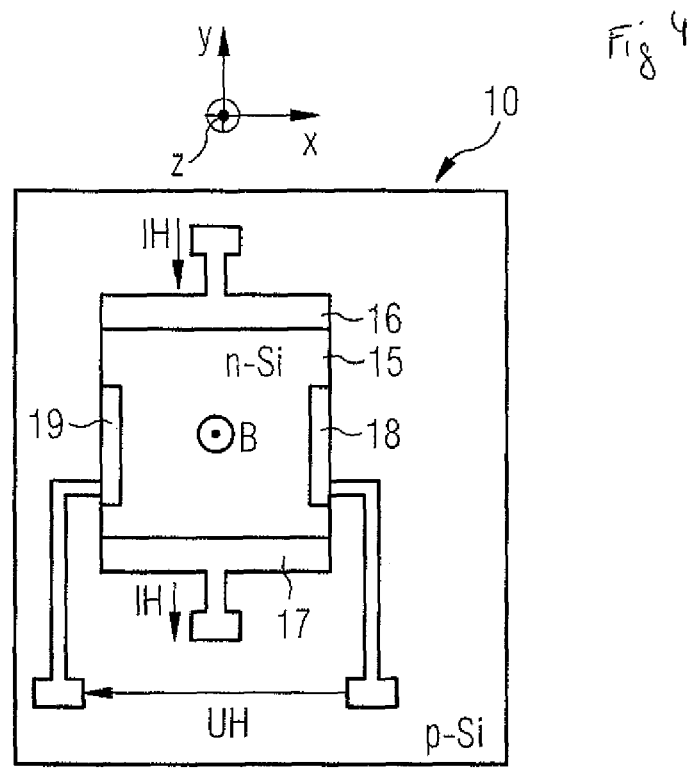

FIG. 4 illustrates a view from above of an implementation of the magnetic sensor as may be used, for instance, in the sensor system 100. The magnetic field sensor is implemented in the form of a Hall sensor on the semiconductor body 10. For this purpose, the semiconductor body 10 incorporates a diffusion area 15 of semiconductor material, for instance of n-doped silicon, which also includes four connecting points 16 to 19. The first two terminals, 16 and 17, are provided in order to supply an excitation current IH. The other two terminals, 18 and 19, which are located essentially along the longer side of the diffusion area 15, are used to access the Hall voltage UH.

When operated with a magnetic field B passing through it, the excitation current flowing through a Hall sensor generates, due to the Hall effect, a Hall voltage UH across the terminals 18 and 19. From the direction, that is the arithmetic sign, of the Hall voltage UH it is possible to determine the direction of current flow if the magnetic field is known, or to determine the direction of the magnetic field if the electrical current is known. On the Hall element illustrated, the sensor output signal UH is approximately proportional to the product of the excitation current IH and the component of the magnetic field B that passes perpendicularly through the Hall sensor. Given the excitation current, it is thus possible to determine the z-component of the magnetic field B, and thereby to determine the inclination of the magnetic field.

If two sensors that are located opposite one another, as in the embodiments illustrated, are used, the flow of current through one sensor can, for instance, be in the opposite direction to that in the sensor on the other side. As a result, when the magnet is in its rest position, opposing Hall voltages are generated. In the ideal case, adding these voltages will give the result 0, assuming the perpendicular components of the magnetic field B through the sensors have the same magnitude. It is also possible that, when the magnet is in the rest position, the current through one or both sensors can be adjusted so that the total signal disappears. Currents that flow in opposite directions allows the sensor signals simply to be added, in order to obtain the difference as a sensor output signal.

In a further embodiment, a magneto-resistor, in which an electrical resistance depends on the magnetic field B, can be used instead of the magnetic field sensors.

The invention implements a sensor system that permits the detection of a displacement as well as of a tilt in the magnets in any direction. This is not restricted to the geometrical arrangements illustrated. Through evaluation, involving the formation of different signals from oppositely positioned sensors and using a further sensor to generate a correction, the determination of the directions of the displacement or tilt is simplified.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

I claim:

1. An arrangement for detecting movement of a body, comprising:
   a body mounted to be movable in at least one direction, said body comprising a magnet having poles aligned essentially along a primary plane;
   a detector system comprising at least four magnetic field sensors configured to detect a change in the magnetic field when the body moves, said detector system comprising at least one additional magnetic field sensor configured to generate a correction signal based on the magnetic field;
   and an evaluation unit configured for the provision of movement information for the body derived from signals from the at least four magnetic field sensors and from the correction signal from the at least one additional magnetic field sensor; The evaluation unit further configured to add two of the signals from the at least four magnetic field sensors and subtract two of the signals from the at least four magnetic field sensors to generate each of a first sum signal and a second sum signal.

2. The arrangement according to claim 1, wherein the at least four magnetic field sensors are located essentially in a plane parallel to the primary plane.

3. The arrangement according to claim 1, wherein the at least one additional magnetic field sensor is arranged symmetrically with respect to a rest position of the body.

4. The arrangement according to claim 1, wherein each pair of the at least four magnetic field sensors is arranged along an axis, and wherein the at least one additional magnetic field sensor is located substantially symmetrically with respect to a point where the axes of each said pair of the at least four magnetic field sensors intersect with one another.

5. The arrangement according to claim 1, wherein each of the at least four magnetic field sensors is positioned with an offset of 45° with respect to two primary directions of movement of the body.

6. The arrangement according to claim 1, wherein the evaluation unit is configured to form a sum signal from the signals of the at least four magnetic field sensors and the correction signal of the at least one additional magnetic field sensor.

7. The arrangement according to claim 1, wherein the evaluation unit is configured to perform linearization of the signals from the at least four magnetic field sensors based on the correction signal from the at least one additional magnetic field sensor.

8. The arrangement according to claim 1, wherein the evaluation unit is configured to perform vector addition of the individual signals output by the at least four magnetic field sensors.

9. The arrangement according to claim 1, wherein a current flowing through the at least one additional magnetic field sensor is based on a movement of the body.

10. The arrangement according to claim 9, wherein the evaluation unit is coupled with a controllable current source configured to excite the at least one additional magnetic field sensor, and where the current source is configured to deliver a current based on the movement information provided by the evaluation unit.

11. The arrangement according to claim 1, wherein the evaluation unit is coupled to the controllable current source.

12. The arrangement according to claim 1, wherein the evaluation unit is configured to add two of the signals from the at least four magnetic field sensors and subtract two of the signals from the at least four magnetic field sensors to generate each of a first sum signal and a second sum signal.

13. The arrangement according to claim 12, wherein the evaluation unit is configured to scale the first and second sum signals with a total sum signal obtained from the signals of the at least four magnetic field sensors and the correction signal.

14. A magnetic field detection arrangement, comprising:
a body mounted movably that comprises a magnet, the poles of the magnet being aligned substantially in parallel with a primary plane;
at least four magnetic field sensors spaced apart from one another for detecting a movement of the body and which deliver a signal that depends on the movement; at least one additional magnetic field sensor located symmetrically with reference to a rest position of the body; and an evaluation unit configured to provide a differential evaluation of the signals of the at least four magnetic field sensors, whereby a signal from the at least one additional magnetic field sensor is used for scaling and linearization; wherein the evaluation unit is further configured to add two of the signals from the at least four magnetic field sensors and subtract two of the signals from the at least four magnetic field sensors to generate each of a first sum signal and a second sum signal.

15. The magnetic field detection arrangement according to claim 14, wherein the evaluation unit is configured to perform a vectorial evaluation of the signals from the at least four magnetic field sensors in two primary directions of movement, scaled based on a total signal strength derived from the signals of the at least four magnetic field sensors and the signal of the at least one additional magnetic field sensor.

16. The magnetic field detection arrangement according to claim 14, wherein the spacing between two of the of at least four magnetic field sensors is in a range between 1.2 to 1.5 times the diameter of the magnet.

17. The magnetic field detection arrangement according to claim 14, wherein a spacing of the magnet from a plane in which the at least four magnetic field sensors are located is in a range between 0.5 and 1.5 times the diameter of the magnet.

18. The arrangement according to claim 14, further comprising a controllable current source configured to supply the at least one additional magnetic field sensor with a current based on the movement of the body.

19. The arrangement according to claim 14, wherein said evaluation unit is configured to add two of the signals from the at least four magnetic field sensors and subtract two of the signals from the at least four magnetic field sensors to generate each of a first sum signal and a second sum signal.

20. The arrangement according to claim 19, wherein the evaluation unit is configured to scale the first and second sum signals with a total sum signal obtained from the signals of the at least four magnetic field sensors and the correction signal.

21. A method for the operation of a magnetic field detection arrangement having a movably mounted body comprising a magnet located in a primary plane, at least four magnetic field sensors positioned substantially parallel to the primary plane and spaced apart from one another, and at least one additional magnetic field sensor, wherein the method comprises the steps of:
detecting a magnetic field through the at least four magnetic field sensors; generating at each of the at least four magnetic field sensors a signal based on the detected magnetic field; simultaneously detecting the magnetic field by at least one additional magnetic field sensor; generating by the at least one additional magnetic field sensor a correction signal based on the detected magnetic field; forming a first and a second sum signal from the four signals generated by the at least four magnetic field sensors such that the first and second sum signals each constitute a measure of a movement of the body in one of two primary directions of movement; and scaling the first and second sum signals with a total sum signal obtained from the signals of the at least four magnetic field sensors and the correction signal; wherein two of the signals from the at least four magnetic field sensors and subtract two of the signals from the at least four magnetic field sensors to generate each of the first sum signal and the second sum signal.

22. The method according to claim 21, wherein a ratio is formed of each sum signal of the at least four magnetic field sensors to the total sum signal to scale the first sum signal and the second sum signal.

23. The method according to claim 21, further comprising:
exciting the at least one additional magnetic field sensor with a current to generate the correction signal; and
changing the current based on a movement of the body.

24. The method according to claimed 23, wherein the current is changed based on a signal derived from the scaled first and second sum signals with the total sum signal.

* * * * *